United States Patent [19]

Laurin et al.

[11] 4,120,992

[45] Oct. 17, 1978

[54] ABRASION-RESISTANT OPTICAL ELEMENT

[75] Inventors: Bernard L. Laurin, Ludlow; Don H. Rotenberg, Westboro, both of Mass.; Harry D. Crandon, Woodstock, Conn.

[73] Assignee: American Optical Corporation, Southbridge, Mass.

[21] Appl. No.: 809,497

[22] Filed: Jun. 23, 1977

Related U.S. Application Data

[62] Division of Ser. No. 644,710, Dec. 29, 1975, Pat. No. 4,049,868.

[51] Int. Cl.$^2$ ................... B05D 3/02; B05D 3/06; B05D 3/10; G02B 1/10
[52] U.S. Cl. .................................. 427/164; 427/44; 427/162
[58] Field of Search ................ 427/162, 164, 44

[56] References Cited

U.S. PATENT DOCUMENTS

| 3,652,379 | 3/1972 | White et al. ................ 428/412 |
| 3,953,115 | 4/1976 | French et al. ............ 428/412 X |
| 3,971,872 | 7/1976 | LeBoeuf ....................... 428/412 |

*Primary Examiner*—James R. Hoffman
*Attorney, Agent, or Firm*—Jeremiah J. Duggan; Alan H. Spencer

[57] ABSTRACT

An abrasion-resistant organic optical element comprising a transparent base of a synthetic organic material having an adhering coating of an abrasion-resistant material comprising a polysilicic acid ester of an alcohol containing from 1 to 12 carbon atoms and a partially hydrolyzed vinyl polymer to provide polyvinyl alcohol, the coating being cross-linked with formaldehyde or zirconyl nitrate or mixtures thereof. The abrasion-resistant organic optical elements can comprise sheet material or a lens.

5 Claims, No Drawings

ABRASION-RESISTANT OPTICAL ELEMENT

This is a division of application Ser. No. 644,710 filed Dec. 29, 1975, now U.S. Pat. No. 4,049,868.

BACKGROUND OF THE INVENTION

1. Field of the Invention

This invention relates to a novel optical element particularly a novel lens of an organic synthetic polymer having a transparent abrasion-resistant coating adhered thereto and to novel and improved methods of making such coated elements.

2. Description of the Prior Art

Heretofore, methods have been proposed for improving the surface characteristics and scratch resistance of solid organic polymers particularly transparent polymeric materials. In U.S. Pat. Nos. 2,404,426 and 2,404,357, methods are disclosed for coating synthetic polymers particularly methylmethacrylate polymers using an ethyl silicate. It is disclosed that the ethyl silicate can be cross-linked using an amine present in combination with moisture during the drying, baking or aging operations.

Abrasion-resistant coatings are also disclosed in U.S. Pat. No. 3,700,487 in which there is claimed a polycarbonate substrate coated with a lightly cross-linked polyvinyl alcohol coating and U.S. Pat. No. 3,484,157 in which there is disclosed an abrasion-resistant plastic transparent optical element having a directly adhering coating comprising a vinyl polymer cross-linked with a dialdehyde cross-linking agent.

Previous attempts to provide an abrasion-resistant coating have failed to provide a sufficiently abrasion-resistant coating which can be applied from a water solution by a dipping operation in which a substantial thickness of coating is applied to the synthetic organic base material. Prior art coatings have been limited to a relatively thin coating of about 1 micron. Those coatings applied by the technique of spin coating, a method well-known to those skilled in the art are especially limited by the thickness of coating which can be applied in one application. The two problems are solved by the methods and compositions of the present invention. Greater abrasion resistance is provided by the use of a relatively thick coating on the synthetic organic polymer substrate. In addition, the methods and composition of the present invention have overcome the discoloration of some prior art coatings when applied in successive layers. The distinct yellow coloration of prior art coatings is objectionable particularly in an optical element.

SUMMARY OF THE INVENTION

There is provided a process and compositions according to the present invention for coating an organic synthetic polymer substrate with an abrasion-resistant surface coating comprising a polysilicic acid ester of an alcohol containing from 1 to about 12 carbon atoms, said ester having up to 4 ester groups per silicon atom, a partially hydrolyzed vinyl polymer to provide polyvinyl alcohol and, as a cross-linking agent, formaldehyde, zirconyl nitrate or mixtures thereof. Said coating can be applied to the organic synthetic polymer base material by dip coating or by other methods known to those skilled in the art of making plastic lenses. Subsequent to coating, the lens can be allowed to dry such as by air for about 15 minutes to about 60 minutes or longer and then is baked at a temperature of about 80° C to about 140° C.

The process and compositions of the invention provide an improved abrasion-resistant, non-yellowing coating suitable for application to organic synthetic polymer substrates. Abrasion resistance of the coated polymer can be substantially improved by increasing the coating thickness from a thickness of about 1 micron to about 2 to about 8 microns, utilizing a high proportion of the acid polysilicic ester over the polyvinyl alcohol and by the use of formaldehyde, zirconyl nitrate or mixtures thereof as a cross-linking agent.

DESCRIPTION OF THE PREFERRED EMBODIMENTS

The abrasion-resistant optical element of this invention includes a transparent base element formed of a conventional organic optical material by conventional means. For example, a preferred embodiment of this invention can incorporate a base lens element cast in the manner described in U.S. Pat. No. 3,136,000 issued June 9, 1964 to C. M. Slyk. Other conventional processes for forming organic lens elements and the like by injection molding, thermal forming, casting etc. can also be used within the scope of this invention. Although lens elements are described herein, the base optical element can also comprise sheet materials such as materials for use in eye shields, including windows within the scope of this invention.

The organic material forming the transparent base element of the invention comprises a polymeric cellulose optical material such as cellulose acetate, cellulose actate butyrate, cellulose acetate propionate; polymers and copolymers of styrene, methyl methacrylate and diethylene glycol bis allyl carbonate; polycarbonates such as Bisphenol A polycarbonate also can be used. Copolymers can be formed with certain of the foregoing monomers and with these monomers and comonomers such as vinyl acetate, methylmethacrylate, ethyl acrylate, and triallyl cyanurate.

In accordance with this invention, the transparent base element is coated with a coating composition comprising a polysilicic acid ester of an alcohol containing from 1 to about 12 carbon atoms, said ester having up to 4 silicic acid ester groups per silicon atom, a partially hydrolyzed vinyl polymer to provide polyvinyl alcohol and in which formaldehyde, zirconyl nitrate or mixtures thereof are incorporated as a cross-linking agent. Preferably, the coating solution comprises an aqueous solution of polyvinyl alcohol and formaldehyde; the formaldehyde being present with the polyvinyl alcohol in a stoichiometric ratio so that sufficient formaldehyde will be present to allow full reaction with the hydroxyl content of the polyvinyl alcohol. The formaldehyde is preferably added in the form of an aqueous solution having a concentration of about 37 weight percent. The polyvinyl alcohol can comprise partially hydrolyzed vinyl polymer such as polyvinyl acetate having a degree of hydrolysis between about 70 percent and about 90 percent or so-called "fully hydrolyzed" polyvinyl acetate to provide a polyvinyl alcohol content of about 90-99 percent. The molecular weight of the polyvinyl alcohol can be from about 10,000 to about 125,000 on a weight average basis.

The coating solution is prepared having an active solids concentration of about 10 to about 30 percent by weight and the proportion of polyvinyl alcohol to polysilicic acid ester is about 1:2 to about 1:5, with a controlled ph of 2.0 to 3.5.

The commercially available technical grade of organic silicate is ethyl silicate which is chiefly tetraethylorthosilicate. Other esters of silicic acid can be utilized in the process of the invention. For instance, other alcohols containing from 1 to about 12 carbon atoms can be utilized in forming the silicate ester atoms. The silicic acid from which the polysilicic acid ester is prepared contains hydroxyl groups attached to silicon. The esters which are prepared from the silicic acid are in turn hydrolyzed prior to application to the organic polymer substrates of the invention. Polysilicic acid esters are characterized by the following structure:

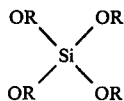

where R is a $-(CH_2)_n-CH_3$ radical in which $n$ is 0 to 11 or a

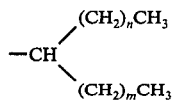

radical in which $n + m = 0$ to 10.

The polysilicic acid ester can be hydrolyzed by using an amount of water equal to at least 15 percent by weight of the ester. For instance, ethyl silicate, commercially available as chiefly tetraethylorthosilicate, can be hydrolyzed by adding the material to a solution of freshly prepared polyvinyl alcohol at elevated temperature.

The polyvinyl alcohol solutions of the invention can be prepared as aqueous solutions by adding the polyvinyl alcohol to the desired amount of boiling demineralized water while under strong agitation at the time of addition of the polyvinyl alcohol. Agitation is maintained until a complete solution is obtained. For the purposes of the invention, polyvinyl alcohol solutions are prepared having a solids concentration of between 3 and 8 percent so as to provide a suitable viscosity for application to the polymer substrate by the process of dip coating. The final coating solution has a viscosity, as measured at 25° C on the Brookfield Viscometer of between about 75 to about 225 centipoise, preferably about 150 to about 175 centipoise. The total active solids concentration of the coating solution is about 10 to about 30 percent by weight.

Where the synthetic polymer base element is formed of polycarbonate or a diethylene glycol bis allyl carbonate polymer and the coating solution comprises polyvinyl alcohol, hydrolyzed tetraethylorthosilicate and formaldehyde as a cross-linking agent, the coated element after partial drying at room temperature is preferably heated to cure the coating at a temperature of up to about 140° C for a period of from about ½ to about 10 hours or longer. Similar heating cycles can be employed for drying and curing other coated lens elements of the invention as will be recognized by persons skilled in the art of providing lenses from synthetic polymer substrates.

It is particularly surprising that even though U.S. Pat. No. 3,484,157 teaches cross-linking polyvinyl alcohol prepared from hydrolyzed polyvinyl acetate using a dialdehyde cross-linking agent such as glyoxal, pyruvic aldehyde, 2-hydroxyaldehyde and glutaraldehyde, and it is also known to cross-link polyvinyl alcohol with formaldehyde, that a coating composition containing a combination of polyvinyl alcohol and a polysilicic acid ester of an alcohol, as previously described, would provide a substantially colorless transparent abrasion-resistant film subsequent to baking to cross-link the film. A similar composition containing a dialdehyde cross-linking agent such as glyoxal as a substitute for formaldehyde provides a film which discolors upon being subjected to baking conditions to provide a cross-linked, abrasion-resistant film. The yellowing experienced with the use of glyoxal as a cross-linking agent necessarily limits the thickness of the abrasion-resistant film which can be applied to produce a commercially acceptable product and thus the degree of abrasion resistance is thereby limited as well. Use of formaldehyde in the process of the present invention provides an entirely unexpected degree of cross-linking since it is commonly considered a monofunctional cross-linking agent. The degree of cross-linking with formaldehyde has been found to be completely adequate to provide the required degree of water resistance and permanence of the protective abrasion-resistant coating on the organic polymer substrate. Thus, it has been found unnecessary to utilize a dialdehyde to provide cross-linking between adjacent molecular chains of polymeric material in the coating.

By the process of the invention, at least one side of a synthetic organic polymer base lens element is coated with the coating solution of the invention by any conventional coating process, for instance, the lens element can be coated in a single application by dipping in the coating solution to form a uniform coating following which the coating lens is allowed to partially dry at ambient temperature and then baked at elevated temperature to cross-link the reactive portions of the coating and form a transparent cross-linked abrasion-resistant coating on the lens element of the invention.

The coating solution of the invention can also contain a surface active agent to provide better leveling of the inventive coating. Surface active agents which have been found satisfactory can be selected from the nonionic cationic, and anionic types of surface active agents. The selection of surface active agents and their use as leveling agents are well-known to those skilled in the coating art and, therefore, selection of suitable materials would be within the skill of those persons knowledgeable in the coating art. Useful leveling agents selected from each of the above types of surface active agents are as follows: nonionics such as iso-octyl phenoxy polyethyoxy ethanol, cationics such as quaternary ammonium compounds, for instance, cetyl tri-methyl ammonium bromide and anionics such as fatty acid, rosin and tall oil soaps. Specific agents such as Dupont "Zonyl" FSA and "Zonyl" FSC, Union Carbide L.5310 and L76 and Rohm & Hass "Triton" X-100 have been used and found to provide satisfactory leveling. It has been found that because greater uniformity of the coating is obtained that the use of a surface active agent in the coating solution provides greater optical clarity in the dried abrasion-resistant coating. Where the surface active agent is omitted from the coating composition, striations and other imperfections in the dried coating often appear.

As an alternate method of applying the inventive coating, the lens can be spun on a rotating chuck and the coating solution applied to at least one side of the spinning lens in accordance with procedures well-known to those skilled in the art. The coated lens is then partially dried at ambient temperature and heated to about 80° to about 140° C for a period of about ½ to about 10 hours or longer in order to further dry and cross-link the abrasion-resistant coating.

In order to provide adequate adhesion of the abrasion-resistant coating to the polymer lens element, a surface treatment is first applied to the organic polymer lens element of the invention. The surface treatment can be effected by hydroxylation of the surface of the synthetic polymer lens base preferably by subjecting said base to treatment at a temperature of about 10° to about 40° C, preferably room temperature, using an aqueous solution of an alkali such as sodium hydroxide or potassium hydroxide. The concentration of alkali can be from about 2 percent by weight to about 20 percent by weight and the treatment time can be about 2 minutes to about 1 hour. Alternatively, adhesion promoting materials known in the prior art can be coated onto the organic polymer lens of the invention to promote adhesion. Such materials include but are not limited to: low molecular weight organosilanes such as gama-amino propyl triethoxysilane; organic titanates or zirconates such as tetra isopropyl orthotitanate; polyvinyl butyral and polyamides. Other adhesion promoting surface treatments include but are not limited to treatment with chromic acid and radiation treatment.

As alternates for the coating solution components described above, we know of only one substitute for formaldehyde as a cross-linking agent to provide the non-yellowing, abrasion-resistant coating on the synthetic polymer lens element of the invention. Formaldehyde or zirconyl nitrate or mixtures thereof are unique in providing the required degree of water resistance and moisture resistance of the coated lens element and yet at the same time providing a coating which is non-yellowing after exposure to baking temperatures of about 80° C to about 140° C to cross-link the coating. To provide the polyvinyl alcohol component of the coating solution of the invention, a partially hydrolyzed vinyl polymer such as polyvinyl butyral, polyvinyl acetate, or other polyvinyl acetals can be used. Mixtures of partially hydrolyzed polyvinyl butyral, polyvinyl formal and polyvinyl acetate can also be utilized.

We know of no substitute for the polysilicic acid ester component of the coating solution of the invention. However, mixtures of the polysilicic acid ester of the invention with monomeric or, alternatively, low molecular weight polymers of organic silicon such as alkyl substituted silicon, for instance, dimethyl diethoxy silicon and monomethyl triethoxy silicon have been found to provide an effective abrasion-resistant and water-resistant coating when used to replace the polysilicic acid ester component of the invention.

The coated optical elements of this invention display greatly improved abrasion resistance in comparison to the coatings of the prior art. The use of a predominant proportion of silicic acid ester in the coating is believed to provide the increased abrasion resistance. At the same time, the water resistance and moisture resistance of the optical elements of the invention are not thereby sacrificed. For example, a coated lens element comprising poly(diethylene glycol bis allyl carbonate)-based lens element having a coating comprising polyvinyl alcohol obtained by the partial hydrolysis of polyvinyl acetate, tetraethylorthosilicate and formaldehyde prepared and applied in accordance with the process of this invention was subjected to a wiping test in which a felt pad impregnated with a silicon carbide abrasive sold under the trademark "Crystalon" number 600 B mesh by the Norton Company is mechanically rubbed across the surface of the optical element being tested with an applied force of 200 grams per square inch. Prior to testing and after each 50 wiping strokes, the light scattering properties of the wiped section of the lens is tested with a hazemeter according to ASTM Test D1003-52. The coated lens element of the invention having a coating thickness of about 5 microns showed high abrasion resistance as indicated by only 0.3 percent haze developing after 50 wiping strokes in comparison with the uncoated lens element which showed a haze reading of 6–7 percent after 50 wiping strokes. This test is one of several that may be used.

This test illustrates the great superiority of the optical element of the invention with respect to abrasion resistance in comparison with the best organic lens previously known in the art. In comparison with the known abrasion-resistant coatings of the prior art utilized for organic lenses, the coated lenses of this invention are superior in color and abrasion resistance. Coating solutions of the prior art when used at a coating thickness of about 5 microns on an organic lens readily discolor during the cure cycle. In addition, successive applications of coating are required to obtain the required thickness while the coating solution of the invention can be applied to the organic polymer lens in a single application to obtain the required coating thickness.

The following Examples illustrate the various aspects of the invention but are not intended to limit it. Where not otherwise specified throughout this specification and claims, temperatures are given in degrees centigrade and parts are by weight.

EXAMPLE I

An abrasion-resistant coating solution was prepared in accordance with the teaching of this invention by hydrolyzing tetraethylorthosilicate by incorporating this material into a polyvinyl alcohol solution at room temperature. A polyvinyl alcohol having a molecular weight of about 85,000 (weight average) was used. Polyvinyl alcohol can be prepared by hydrolysis of polyvinyl acetate. Approximately 70 percent of the acetate groups are replaced by hydroxyl groups in the polyvinyl alcohol used. The polyvinyl alcohol was mixed with demineralized water at room temperature and dissolved by heating the mixture to about 90° C while maintaining the mixture under strong agitation.

The coating solution contains the following percentages of materials:

| Component | Parts by Weight |
| --- | --- |
| demineralized water | 50.2 |
| ethanol | 25.1 |
| polyvinyl alcohol[1] | 5.0 |
| tetraethylorthosilicate | 17.3 |
| surface active material as a leveling agent[2] | 0.01 |
| formaldehyde (37%) | 2.50 |

[1] Sold under the trademark "Elvanol"
[2] Sold under the trademark "Zonyl" FSA

The viscosity of the above solution was evaluated at 25° C and found to be 175 centipoise as measured using a Brookfield Viscometer.

The pH of the coating of this example was adjusted to 3, and it should be noted that depending upon coating constituents, performance (coloration) may be optimized at other values within the range stated previously.

Poly(diethylene glycol bis ally carbonate) lenses were surface hydrolyzed to promote adhesion to the lenses of the abrasion-resistant coating to be subsequently applied. The lenses are hydrolyzed by dipping into a 15 percent solids solution of sodium hydroxide for 15 minutes, the solution being maintained at 25° C and then, after rinsing the lenses with water and drying, the lenses were coated by dipping into the above abrasion-resistant coating solution. The lenses were withdrawn from said solution and the coating solution allowed to drip off the lenses so that an even coating is provided on the lenses. The application of the coating is performed at a temperature of about 20°-25° C and subsequently the coated lens after partial drying at this temperature was subjected to a cure cycle of 5 hours at 121° C.

The coated lenses were evaluated and found to have a coating thickness of about 5 microns on both sides of the lens. The lens was evaluated for abrasion resistance after 2000 wiping strokes by measuring percent haze according to ASTM D1003 in comparison with an uncoated sample of poly(diethylene glycol bis allyl carbonate) and results are as follows:

| Coating | Percent Haze |
| --- | --- |
| Example 1 (5 microns) | 2–3 |
| Control (no coating) | 11–14 |

The coated lenses prepared in Example 1 were placed in a humidity test chamber maintained at a temperature of 71.6° C and 95 percent relative humidity. The test conditions are as follows: Eight hours exposure in the humidity chamber followed by 16 hours at ambient temperature to provide one cycle. Examples exposed to a total of 3 cycles show no loss in adhesion of the coating on the coated lenses.

The abrasion test employed in this example is different but equivalent to the test earlier described.

Example 1 constitutes the best mode of the practice of the invention now known.

EXAMPLE 2

A polycarbonate lens can be coated with the same abrasion-resistant coating described in Example 1. However, rather than the use of an hydrolysis treatment, an adhesion promoter is applied to provide adhesion of the abrasion-resistant coating. Gamma-aminopropyltriethoxysilane is dissolved in ethanol and hydrolyzed prior to application to the lens as a prime coat. After preparing the above ethanol solution, the adhesion promoter is applied by a simple dipping operation. The coating of the invention is applied and cured as in Example 1.

EXAMPLE 3

The coating solution of Example 1 was repeated substituting 0.8 percent zirconyl nitrate for the formaldehyde used in Example 1. Coated lenses of diethylene glycol bis allyl carbonate were similar in appearance and properties to those of Example 1.

EXAMPLE 4

A coating solution was prepared following the procedure of Example 1 using the following percentages of materials to illustrate the use of glyoxal as a prior art cross-linking agent.

| Component | Parts by Weight |
| --- | --- |
| water | 50.22 |
| ethanol | 25.1 |
| polyvinyl alcohol | 5.0 |
| tetraethylortho-silicate | 18.8 |
| surface active material as a leveling agent[1] | 0.01 |
| glyoxal | 1.3 |

[1]Sold under the trademark "Zonyl" FSA

A coating of about 5 microns was applied to a lens of poly (diethylene glycol bis allyl carbonate) and cured 5 hours at 121° C. The coating assumes a yellow-brown coloration after curing. This is in contrast to the non-yellowing coatings of the invention made in accordance with the procedure of Example 1.

The abrasion-resistant elements of this invention are characterized by a long and useful life. The abrasion-resistant lenses or other optical elements of the invention can be conveniently cut and edged to any desired shape by conventional means without tending to cause flaking or crazing of the abrasion-resistant coatings on the lenses or elements. The coated elements also display good optical qualities and have the desired lightweight and good impact resistance of prior art organic lens elements. In addition, the abrasion-resistant elements of the invention are relatively inexpensive to manufacture.

While this invention has been described with reference to certain specific embodiments, it will be recognized by those skilled in the art that many variations are possible without departing from the scope and spirit of the invention.

We claim:

1. The process of coating an organic optical element with a transparent, abrasion-resistant surface coating comprising:
    1. surface treating said organic optical element to promote adhesion of said abrasion-resistant surface coating,
    2. applying to at least one surface of said organic optical element a mixture comprising a polysilicic acid ester of an alcohol containing from 1 to 12 carbon atoms, said ester having up to four silicic acid ester groups per silicon atom, a hydrolyzed vinyl polymer, a surface active agent and a cross-linking agent selected from the group consisting of formaldehyde, zirconyl nitrate, and mixtures thereof and
    3. drying and curing said coating at an elevated temperature.

2. The process of claim 1 wherein said process comprises:
    coating one surface of said organic optical element with an aqueous coating solution to a thickness of about 2 to about 8 microns,
    drying a portion of the volatiles from said coating composition at approximately room temperature, and thereafter curing said coating on said organic optical element at an elevated temperature.

3. The process of claim 2 wherein said organic optical element is a lens formed of an organic polymeric material selected from the group consisting of cellulose acetate, cellulose acetate butyrate, cellulose acetate propionate, polymers and copolymers of diethylene glycol bis allyl carbonate, styrene and methylmethacrylate and Bisphenol-A polycarbonate.

4. The process of claim 3 wherein said organic optical element is formed of diethylene glycol bis allyl carbonate and surface treated to promote adhesion by hydrolysis.

5. The process of claim 3 wherein said organic optical element is formed of Bisphenol-A polycarbonate and treated to promote adhesion by exposure to an organo trialkoxy silane.

* * * * *